July 15, 1958     M. J. G. TIPPER     2,842,919
AUTOMATIC STRINGING OF FASTENED CASING ENDS
Filed Dec. 20, 1955     3 Sheets-Sheet 1
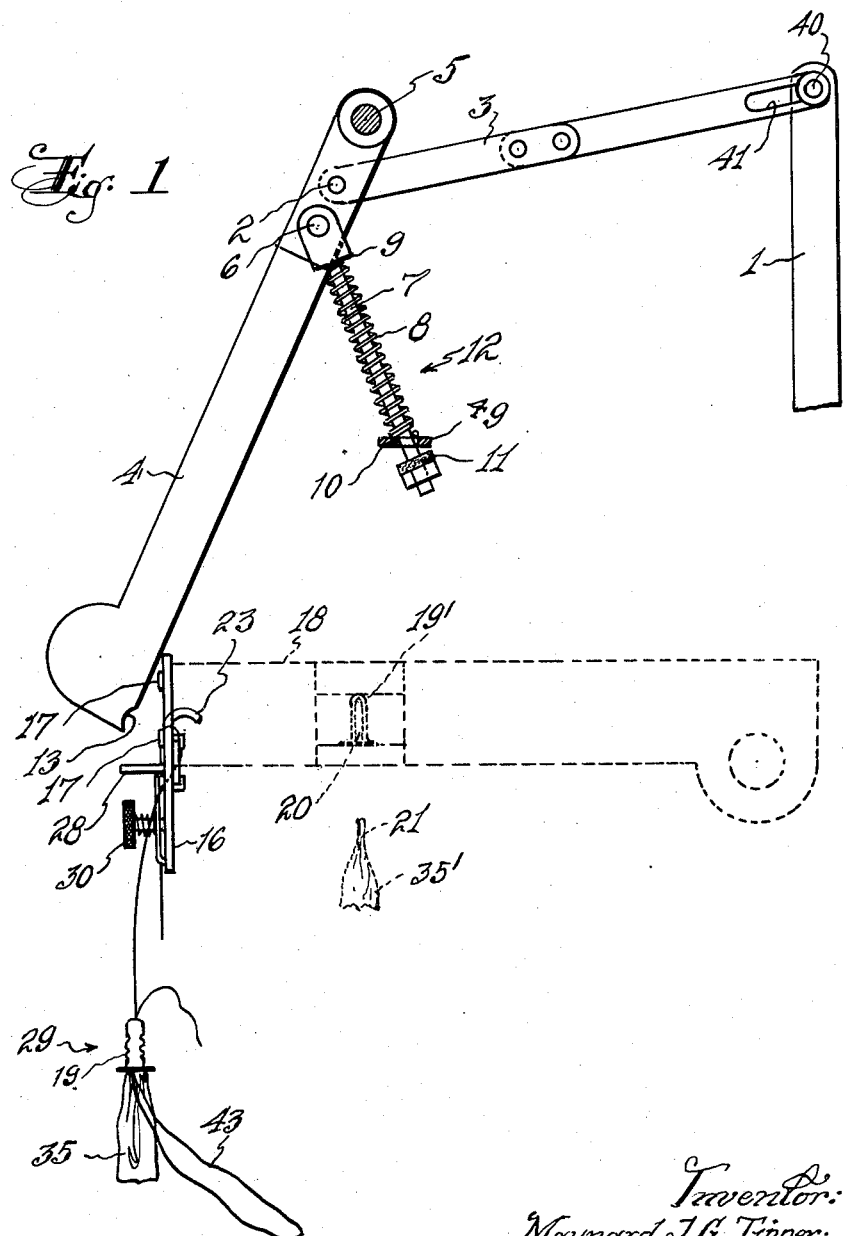

July 15, 1958 M. J. G. TIPPER 2,842,919
AUTOMATIC STRINGING OF FASTENED CASING ENDS
Filed Dec. 20, 1955 3 Sheets-Sheet 2
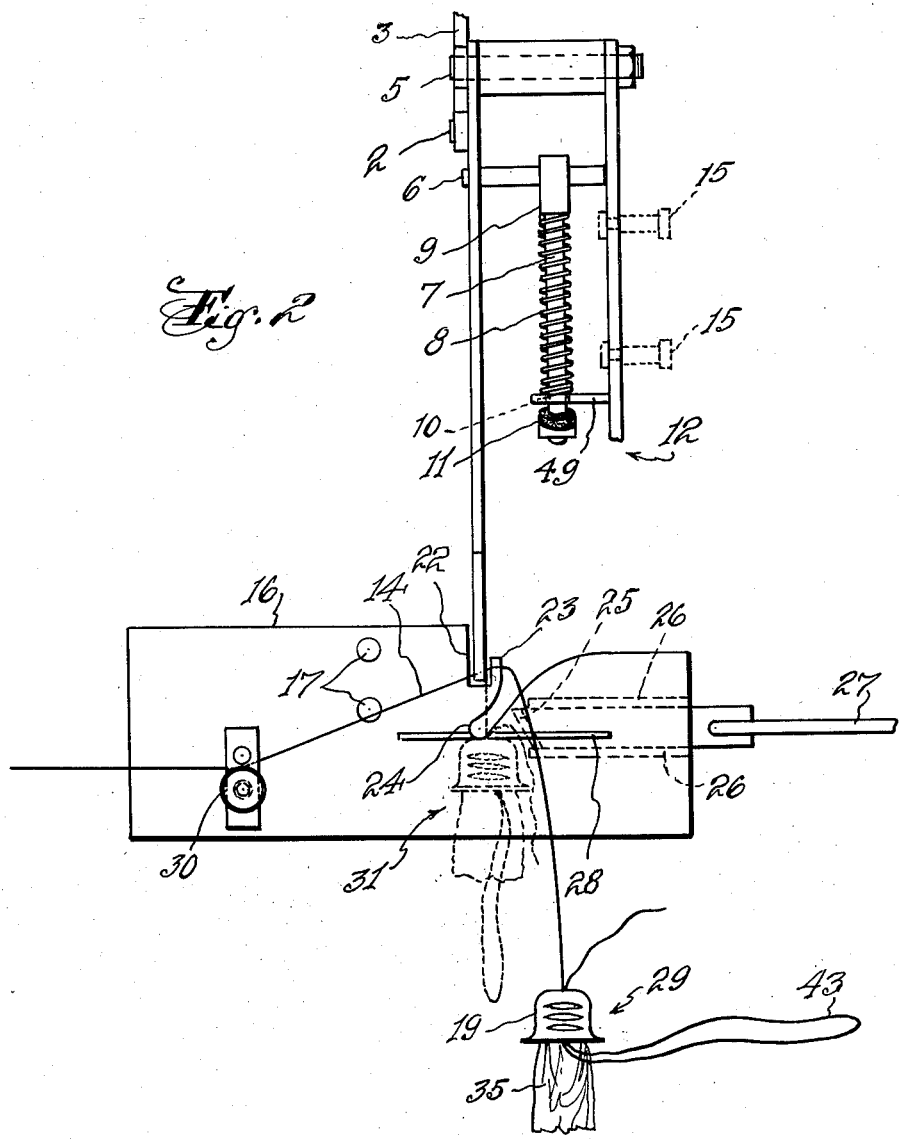

July 15, 1958 M. J. G. TIPPER 2,842,919
AUTOMATIC STRINGING OF FASTENED CASING ENDS
Filed Dec. 20, 1955 3 Sheets-Sheet 3
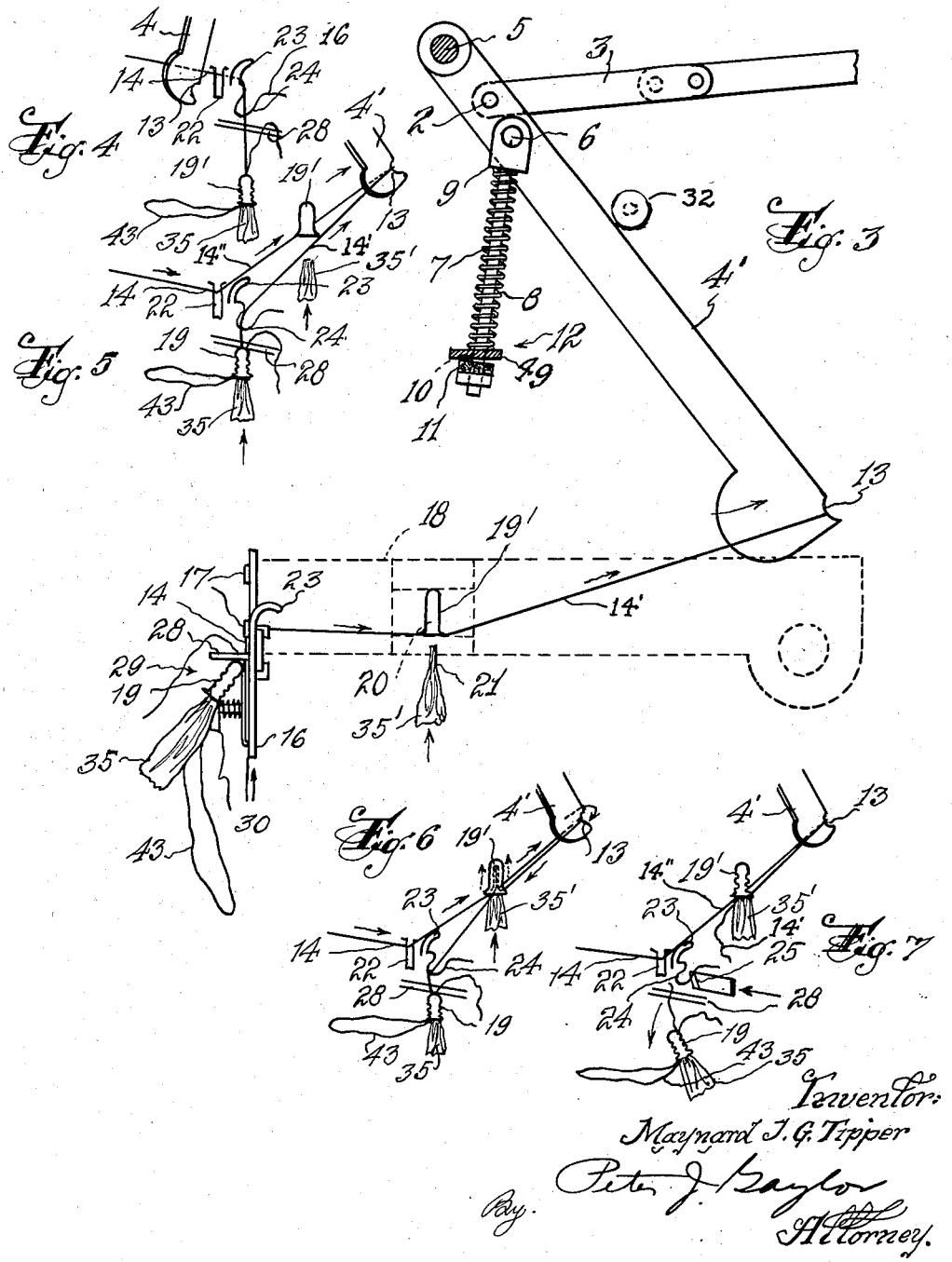

United States Patent Office 2,842,919
Patented July 15, 1958

2,842,919

AUTOMATIC STRINGING OF FASTENED CASING ENDS

Maynard J. G. Tipper, Castro Valley, Calif.

Application December 20, 1955, Serial No. 554,233

4 Claims. (Cl. 53—135)

This invention deals with the automatic insertion of string loops in the fastened ends of sausage casings.

In the preparation of sausages, it is now common practice to fasten the pleated end of the empty casing with a metal eyelet or cap fastener prior to stuffing of the sausage with the meat "emulsion." It is also common practice to punch the fastened end as the fastener is crimped onto the pleated casing, and thereafter apply a pre-tied string loop thereon to facilitate hanging of the fastened sausage. The looping operation is done manually and is done separately from the fastening operation.

The present invention involves the automatic looping of fastened casing ends which enables application of the loop of string simultaneously with the fastening of the casing end, thereby enabling doubling of the speed of the present operations. Another advantage of the present invention is that it enables use of string from a cone, and eliminates the need for the more expensive pre-tied loops. A still further advantage is the fact that the process may be adapted as an adjunct to present casing fastening machines, thereby eliminating separate power sources and other equipment.

The invention will be more readily understood by reference to the accompanying drawings in which a preferred embodiment is depicted. Figure 1 is a view of a preferred embodiment of the invention as applied to a casing fastening machine when viewed in the direction of feeding of the casing for the fastening operation with the looping arm in position before the looping operation, while Figure 2 is a view taken at right angles to that of Figure 1 and is the operator's view of the invention. Figure 3 is a view of the assembly shown in Figure 1, but with the looping arm in position after the looping operation. Figures 4, 5, 6 and 7 are schematic views of the lower portion of the looping arm and auxiliary equipment in successively progressive stages of the looping operation. Similar numerals refer to similar parts in the various figures.

Although the invention is applicable to be used as a separate unit or as an adjunct to any casing fastening machine, the embodiment depicted in the drawings is one applied to the Tipper tie casing fastening machine, the fastening mechanism of which is shown and described in copending application Serial No. 294,467, filed on June 19, 1952, by Maynard J. G. Tipper, now Patent No. 2,742,944.

Referring again to the drawings in the present application, numeral 1 represents an arm, such as an extension of the wiper cam follower (which is designated as element 25 in Patent 2,742,944), although the arm may be directly motivated by a cam on the driveshaft, if desired. This arm 1 is connected to arm 4 at pivot 2 by link 3 (Figure 1). Pivot 40 on the end of arm 1 rides in slot 41 in the other end portion of arm 3. Arm 4, the stringing arm, swings on a fixed pivot at 5. Attached swivelly to arm 4 at pivot 6 is rod 7 around which is mounted compression spring 8, one end of which abuts against shoulder 9 on rod 7 and the other end of which abuts against fixed mounting 49 having hole 10 through which slides rod 7. Rubberized bumper stop 11 mounted on base plate 12 serves to cushion rod 7 as it reaches its leftward limit. Base plate 12 may be bolted by bolts 15 to the center frame of the casing fastening machine.

Stringing arm 4 is provided at its lowermost end with notch or groove 13 made to engage and hold the loop of string 14 fed from a string cone (not shown). Plate 16 is attached by screws 17 to the moving crimping assembly 18 of the fastening machine (equivalent to element 7 in Patent No. 2,742,994). In this assembly is placed cap fastener 19, the center opening 20 of which is slipped over the pleated gathered end 21 of the casing, ready for the crimping operation. It is apparent that plate 16 moves with crimping assembly 18 which crimps fastener 19 tightly on end 21 of the casing.

Plate 16 is provided with slot 22 through which passes the lower end of stringing arm 4. Plate 16 also carries protruding hook 23 disposed adjacent to slot 22 and serving to hold the string for pickup by arm 4. Disposed on the other side and below hook 23 is notch 24 in plate 16 at which point string 14 is cut off by knife 25 which is mounted on rod 27 and aligned between guides 26. A split angle plate 28 is disposed at the low point of notch 24 to enable string 14 to pass into the notch through the split in plate 28 but to prevent passage therethrough of looped and fastened casing 29. Also, there is mounted, on the lower portion of plate 16, a variable tension clamp 30 for placing under tension the string 14 while it is passing to hook 23.

When stringing arm 4 is in the position shown in Figure 1, the fastening machine is in starting position. The flat, collapsed casing is fed into the fastening machine for pleating and, after this operation, the wiping arm cam follower, to which arm 1 is attached, begins its movement causing the wiper arms to gather the pleats of the casing end preparatory for fastening. At this time, arm 4 is moved via link 3 for the stringing or looping operation. As stated previously, arm 1 is actuated by a cam (not shown) which effects the gathering action of the wiper arms of the fastening machine (not shown) on the pleated casing end. Arm 1 pulls arm 4 inwardly and slot 41 allows arm 1 to continue movement over its cam without disturbing arm 3 or arm 4 joined thereto, since pivot 40 is free to travel in slot 41 of arm 3. As arm 4 passes through groove 22, it picks up the string 14 from hook 23 (Figure 2) and the string is held in notch 13. Compression spring 8 on rod 7 has an over-center action tending to hold arm 4 either in the 4 or the 4' position. Tension clamp 30 maintains an even tension on string 14 so that there is no chance of unnecessary slack formation.

When the machine is first started, the end of the string is held by hand until the first casing is looped. Figure 4 shows arm 4 in position just prior to engaging string 14 stretched over slot or notch 22. As the string is pulled over the front opening of fastener 19' (as in Figure 5), the tension pulls the string on previously fastened casing 35 until fastener 19 on said casing is stopped by angle iron 28 (in the slot of which the string rides). Thereafter further pull of arm 4 pulls string from the cone supply (not shown). When arm 4 reaches the end of its operating stroke and hits cushioning bumper 32, the two string portions 14' and 14'' of the loop are stretched tautly and separately across opening 20 of fastener 19', as in Figure 3.

By this time, casing 35' has had its pleated end 21 gathered by the wiping arms of the fastening machine (not shown), ready slipping thereover of fastener 19'. As stated previously, the cap fastener is applied to the casing end 21 by movement of the crimping assembly 18 which moves toward the aligned casing and slips fastener 19' over end 21 of said casing, whereupon the crimping mechanism then crimps the fastener and the string onto the casing end. The crimping mechanism then retracts, leaving the fastened casing in position as in Figure 7.

Since the string strands 33 and 34 are stretched in front of opening 20 of the fastener as the fastener is moved toward the casing, the strands are caught by the casing edge and are pushed into the fastener as in Figure 6. In this latter step, additional string is required. Since spring 8 is of light enough force, the pull on the string created by slipping of the fastener over the casing causes spring 8 to yield a little allowing string portions 14' and 14" to be fed into the fastener from the arm 4' side, tension clamp 30 being sufficient to eliminate slack, but light enough to allow slippage of string therethrough when pulled. The other end of the strand, of course, is held by casing 31 which is pulled tightly against angle iron 28. Final movement of crimping assembly 18 causes cutting of the lower strand 14' in notch 24 as plate 16 moves toward stationary knife blade 25 between guides 26 (Figure 7). Blade 25 is mounted on rod 27 attached to the frame of the machine. Changing the length of rod 27 determines the time when the string will be cut. Upon cutting off of strand 14', a portion of this cut strand is drawn into the fastener in the final movement prior to crimping.

As the looped, fastened casing 35' is removed by hand from the machine, the pull of the loop around notch 13 causes stringing arm 4 to pass its over-center position from 4' to 4, enabling repetition of the operation. This last movement releases the string loop from notch 13 of arm 4 and the fastened casing 35 is dropped over the side of the machine (as in Figure 2) while another casing is fed for repetition of the cycle. The completely severed fastened and looped casings (35 in Figure 7) drop into a bin, or are otherwise removed.

Since the string tends to fly around during these operations, it is desirable to place the string cone supply in a can, with the string passing through a hole in the lid, thus preventing fouling.

It should be pointed out that in Figure 1 the cap fastener 19' is shown at right angles to its actual position to illustrate the entry of the casing end 21 into the cap opening 20. Actually, in this view, the fastener is disposed with its opening facing the reader and the casing would be disposed in front of it in a plane at right angles to the plane of the drawing.

I claim:

1. A string looping device for anchoring string loops between the pleated casing end and the fastener wall during the fastening of a casing end with a hollow fastener, comprising a looping arm pivoted at one end and having, on the other end, engaging means for engaging string from a supply, a plate having holding means for holding string in register with said engaging means when the string is to be engaged, a groove in said plate adjacent said string holding means and in the bottom of which the string remaining attached to a previously fastened casing may be disposed, cutting means positioned in line with the bottom of said groove for cutting said string remaining attached, tensioning means for keeping under tension the free string pulled from the supply by the looping arm, limiting means for limiting the travel of the previously fastened casing attached to the string as it is pulled by the looping arm for the looping operation, timed moving means for moving said looping arm through said string holding means to engage said string and carry a loop of desired length across the entrance opening of the fastener at a time when the pleated casing end is about to be fastened and so that said casing end engages the two strings of the loop as it is fastened, and for moving said looping arm back for another looping operation, and timed moving means for said cutting means to cut said string remaining attached to said previously fastened casing after the fastening operation.

2. A string looping device according to claim 1 which the looping arm is attached to a spring over-center means to keep the arm at rest either in one or the other extreme position.

3. A string looping device according to claim 1 in which the plate is attached to a moving fastener-carrying assembly of the fastening machine.

4. A string looping device according to claim 1 in which the casing fastening machine has a wiper cam follower, and the timed moving means for the looping arm is an extension of said cam follower.

References Cited in the file of this patent

UNITED STATES PATENTS

| | | |
|---|---|---|
| 1,493,075 | Hirschhorn | May 6, 1924 |
| 1,637,509 | Allatt | Aug. 2, 1927 |
| 1,957,554 | Rector | May 8, 1934 |
| 2,036,787 | Zabriskie | Apr. 7, 1936 |